(12) United States Patent
Saha et al.

(10) Patent No.: US 10,460,402 B2
(45) Date of Patent: Oct. 29, 2019

(54) LARGE SCALE MULTI-OBJECTIVE OPTIMIZATION

(71) Applicant: Microsoft Technology Licensing, LLC, Redmond, WA (US)

(72) Inventors: Ankan Saha, San Francisco, CA (US); Shaunak Chatterjee, Sunnyvale, CA (US); Kinjal Basu, Stanford, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 322 days.

(21) Appl. No.: 15/488,137

(22) Filed: Apr. 14, 2017

(65) Prior Publication Data
US 2018/0300334 A1    Oct. 18, 2018

(51) Int. Cl.
| | |
|---|---|
| *G06Q 50/00* | (2012.01) |
| *G06F 16/9535* | (2019.01) |
| *G06N 5/00* | (2006.01) |
| *G06N 20/00* | (2019.01) |

(52) U.S. Cl.
CPC ......... *G06Q 50/01* (2013.01); *G06F 16/9535* (2019.01); *G06N 5/003* (2013.01); *G06N 20/00* (2019.01)

(58) Field of Classification Search
CPC .... G06F 19/00; G06F 16/9535; G06F 16/245; G06F 16/248; G06F 16/285; G06F 21/31; G06F 2221/2141; G06F 16/24575; G06F 2217/08; G06F 2221/2129; G06F 9/5011; G06F 16/435; G06F 16/438

USPC .......... 707/600–831, 899, 999.001–999.206
See application file for complete search history.

(56) References Cited

U.S. PATENT DOCUMENTS

| | | | | |
|---|---|---|---|---|
| 7,624,081 | B2* | 11/2009 | Zhao ..................... | G06F 16/951 706/20 |
| 8,909,771 | B2* | 12/2014 | Heath .................... | G06Q 30/02 705/39 |
| 2007/0239677 | A1* | 10/2007 | Zhao ..................... | G06F 16/951 |
| 2015/0106311 | A1* | 4/2015 | Birdwell ................ | G06F 16/22 706/20 |
| 2016/0078133 | A1* | 3/2016 | Santhanam ......... | G06F 16/9535 707/734 |
| 2017/0017971 | A1* | 1/2017 | Moreau .............. | G06Q 30/0202 |

* cited by examiner

*Primary Examiner* — Angelica Ruiz
(74) *Attorney, Agent, or Firm* — Schwegman Lundberg & Woessner, P.A.

(57) ABSTRACT

A system, a machine-readable storage medium storing instructions, and a computer-implemented method are described herein are directed to Large Scale Optimizing Engine. The Large Scale Optimizing Engine determines a probability, for each content item in a set of content items, of the respective member account performing a content item action. The Large Scale Optimizing Engine identifies a select content item from the set of content items based on determining display of the select content item will meet a first and second target. The Large Scale Optimizing Engine causes display of the select content item in a content slot in the respective member account's social network feed based on satisfaction of the first and second targets.

20 Claims, 7 Drawing Sheets

LARGE SCALE MULTI-OBJECTIVE OPTIMIZATION

TECHNICAL FIELD

The subject matter disclosed herein generally relates to the technical field of special-purpose machines that identify relevant content including software-configured computerized variants of such special-purpose machines and improvements to such variants, and to the technologies by which such special-purpose machines become improved compared to other special-purpose machines that identify relevant content.

BACKGROUND

A social networking service is a computer- or web-based application that enables users to establish links or connections with persons for the purpose of sharing information with one another. Some social networking services aim to enable friends and family to communicate with one another, while others are specifically directed to business users with a goal of enabling the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members are prompted to provide a variety of personal information, which may be displayed in a member's personal web page. Such information is commonly referred to as personal profile information, or simply "profile information", and when shown collectively, it is commonly referred to as a member's profile. For example, with some of the many social networking services in use today, the personal information that is commonly requested and displayed includes a member's age, gender, interests, contact information, home town, address, the name of the member's spouse and/or family members, and so forth. With certain social networking services, such as some business networking services, a member's personal information may include information commonly included in a professional resume or curriculum vitae, such as information about a person's education, employment history, skills, professional organizations, and so on. With some social networking services, a member's profile may be viewable to the public by default, or alternatively, the member may specify that only some portion of the profile is to be public by default. Accordingly, many social networking services serve as a sort of directory of people to be searched and browsed.

DESCRIPTION OF THE DRAWINGS

Some embodiments are illustrated by way of example and not limitation in the figures of the accompanying drawings in which.

DETAILED DESCRIPTION

The present disclosure describes methods and systems for identifying a content item for display in a professional social networking service (also referred to herein as a "professional social network," "social network" or a "social network service"). In the following description, for purposes of explanation, numerous specific details are set forth in order to provide a thorough understanding of the various aspects of different embodiments of the subject matter described herein. It will be evident, however, to one skilled in the art, that the subject matter described herein may be practiced without all of the specific details.

A system, a machine-readable storage medium storing instructions, and a computer-implemented method are described herein are directed to Large Scale Optimizing Engine. The Large Scale Optimizing Engine determines a probability, for each content item in a set of content items, of the respective member account performing a content item action. The Large Scale Optimizing Engine identifies a select content item from the set of content items based on determining display of the select content item will meet (i) a first target amount of actions received from the respective member account in response to display of the select content item to the respective member account and (ii) a second target amount of total actions received from at least a subset of the member accounts in response to display of a preferred content item in the set of content items to the subset of the member accounts. The Large Scale Optimizing Engine causes display of the select content item in a content slot in the respective member account's social network feed based on satisfaction of the first and second targets.

According to various embodiments, the Large Scale Optimizing Engine determines content items to be displayed in social network feeds of multiple member accounts. The Large Scale Optimizing Engine selects content items to be displayed by executing a multi-objective optimization algorithm that adheres to competing constraints. A first constraint is that, for each member account, the Large Scale Optimizing Engine selects a content item from a set of content items that will most likely prompt a desired level of engagement from that member account. However, a second constraint requires that a preferred content item in the set of content items must be displayed to enough member accounts such that a desired total level of engagement occurs from those member accounts as result of display of that preferred content item. It is understood that different kinds of constraints can be defined for specific types (or classifications) of member accounts or types of content items belonging to particular member groups in the social network service.

The Large Scale Optimizing Engine solves, in contrast with conventional systems, a content recommendation problem of showing content items to member accounts such that their engagement (i.e. social network activity) is maximized (e.g. increased) while ensuring that the potential negative flags or complaints received from the member accounts are contained within a limit. The Large Scale Optimizing Engine improves the performance of a special-purpose computer system(s) by efficiently executing a multi-objective optimization algorithm with respect to the scale of the number of member accounts in a social network service. In various embodiments, execution of the multi-objective optimization algorithm by the Large Scale Optimizing Engine occurs simultaneously for millions of member accounts to identify content items (e.g. relevant content items) to be displayed to each member account—such that the first target amount of actions and second target amount of total actions are still met. Such conventional systems are currently unable to perform such multi-objective optimization processing to handle the scale and types of data available from a social network service that has millions of member accounts that can be served content selected from millions of portions of varying types of content.

In one exemplary embodiment, the Large Scale Optimizing Engine executes a machine learning algorithm(s) in an online mode and offline mode—where the online mode is defined as triggered by detection of social network activity of a member account. In the offline mode, all computations by Large Scale Optimizing Engine are executed offline and the results (e.g., best article recommendations for a member account(s)) are pre-computed and used to serve a member account when the member account accesses the social network service. Another example of the Large Scale Optimizing Engine can be an email delivery system in which a machine learning algorithm(s) can be used to determine both the content and appropriateness of an email that should be sent to a member account. In the online mode, on the other hand, the candidate content items (i.e. contents that may be relevant to a member account) are scored when the member account accesses the social network service. The online mode naturally has strict computation constraints, but also provides a different quality of results than the offline mode, since there are more recent social network activity signals from the member account(s) that can be used during online mode as input for one or more calculations or computations.

When constraints are used to specify multi-objective optimization problems, then a two-stage approach is adopted for both the offline and online modes. The two-stage approach is designed since the problem size (e.g. determining relevant content for millions of member accounts) is very large due to the amount of social network data. In Stage 1 (which happens in the offline mode), the Large Scale Optimizing Engine samples a set of member accounts from the entire population of member accounts of the social network service. The Large Scale Optimizing Engine solves the constrained optimization problem for the member account sample, and obtains optimal duals (e.g. Lagrangian dual variables) corresponding to each constraint of the constrained optimization problem. The constrained optimization problem is a quadratic program, since linear programs cannot facilitate the dual to primal conversion which is subsequently required. In Stage 2 (which can be executed in either of the offline or online modes), the dual estimates from Stage 1 are used to convert each member accounts parameters into a primal serving content scheme.

The Large Scale Optimizing Engine generates as output data an identification of a select content item, from a set of content items (1–i), for display to a target member account. As such, in a social network service with 100 million member accounts, 100 million separate content item identifications are determined. For each respective member account, the identified content item is selected on the basis of determining that display of the identified content item to the respective member account satisfies (e.g. meets) competing constraints of a first target of a given likelihood that the respective member account will perform a maximum amount of actions in response to display of the identified content item and a second target that a preferred item in the set of content items (1–i), such as the $5^{th}$ item or the $7^{th}$ item, has been pre-selected to receive a desired amount of member account actions in total from all the member accounts. It is understood that a content item is identified for each member account in the social network service—or a defined group of member accounts. Each member account in a defined group of member accounts can be, for example, those member accounts currently accessing the social network service, or member accounts that registered accounts within a period of time, or member accounts that have applied to a job posting during the last month, past week or the past one or more days.

It is understood that various embodiments described herein include encoded instructions that comprise operations to generate a user interface(s) and various user interface elements. The user interface and the various user interface elements can be displayed to be representative of any type of data, operation, and calculation result described herein. In addition, the user interface and various user interface elements are generated by the Large Scale Optimizing Engine for display on a computing device, a server computing device, a mobile computing device, etc. Such user interface elements can be, for example, one or more content slots of a member account social network content feed. The content slots are positions within the social network content feed at which a content item can be displayed for a period of time.

It is understood that a machine learning data model, used for execution of a machine learning algorithm, is represented according to one more encoded instructions that, when executed, perform calculations that result in inferences, predictions, conclusions and estimations based in part on training data. In one example, the machine learning data model can be a logistic regression model having one or more encoded instructions for feature vector assembly. Other machine learning data models can be a Naïve Bayes model, a support vector machines (SVM) model, a decision trees model, and a neural network model, all of which are understood by those skilled in the art.

Figure 1:
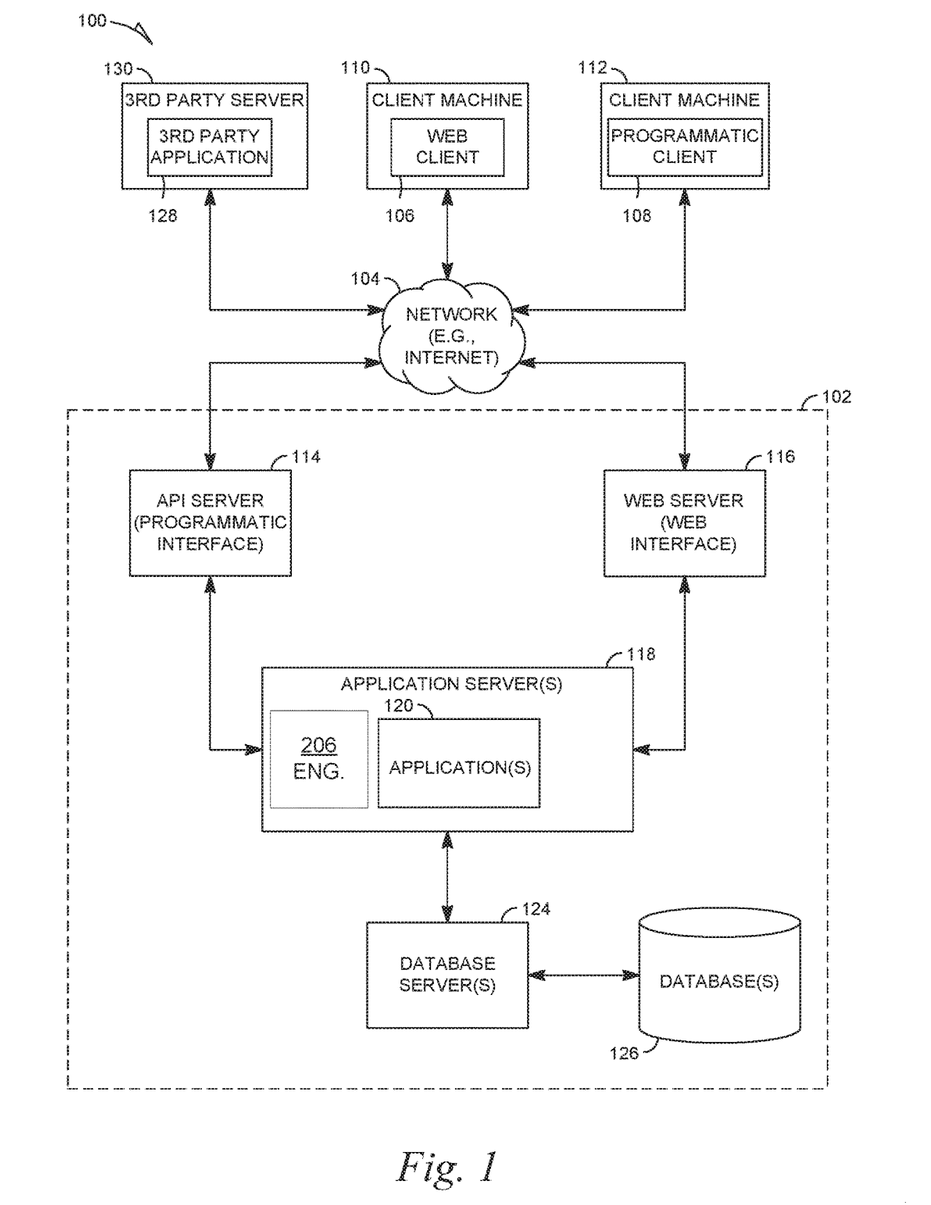
FIG. 1 is a block diagram illustrating a client-server system, in accordance with an example embodiment.

Turning now to FIG. 1, FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102. In some embodiments, the networked system 102 may comprise functional components of a professional social network.

Figure 2:
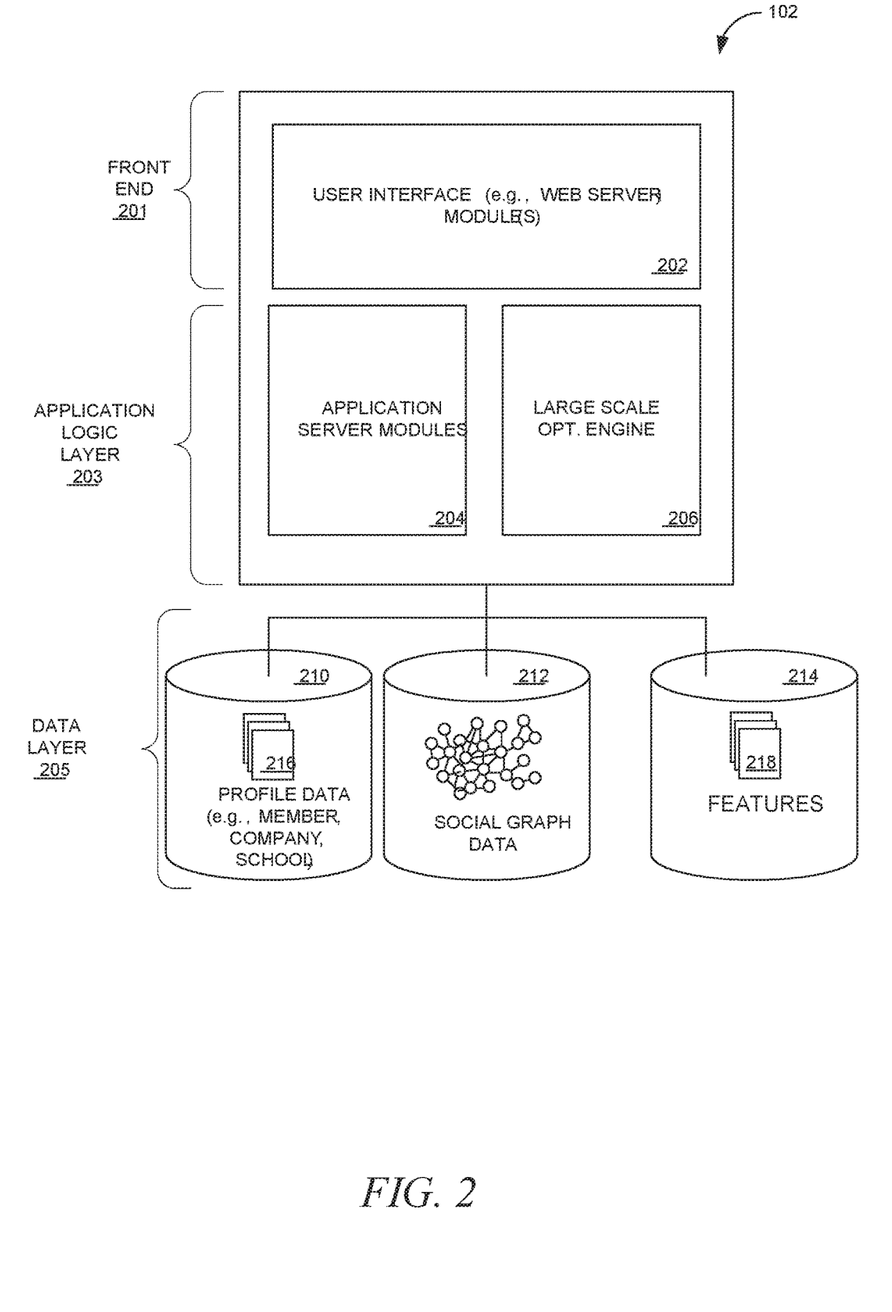
FIG. 2 is a block diagram showing functional components of a professional social network within a networked system, in accordance with an example embodiment.

FIG. 2 is a block diagram showing functional components of a professional social network within the networked system 102, in accordance with an example embodiment.

As shown in FIG. 2, the professional social network may be based on a three-tiered architecture, consisting of a front-end layer 201, an application logic layer 203, and a data layer 205. In some embodiments, the modules, systems, and/or engines shown in FIG. 2 represent a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, one skilled in the art will readily recognize that various additional functional modules and engines may be used with a professional social network, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although a professional social network is depicted in FIG. 2 as a three-tiered architecture, the inventive subject matter is by no means limited to such architecture. It is contemplated that other types of architecture are within the scope of the present disclosure.

As shown in FIG. 2, in some embodiments, the front-end layer 201 comprises a user interface module (e.g., a web server) 202, which receives requests and inputs from various client-computing devices, and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the professional social network. For instance, the ability of an organization to establish a presence in a social graph of the social network service, including the ability to establish a customized web page on behalf of an organization, and to publish messages or status updates on behalf of an organization, may be services implemented in independent application server modules 204. Similarly, a variety of other applications or services that are made available to members of the social network service may be embodied in their own application server modules 204.

As shown in FIG. 2, the data layer 205 may include several databases, such as a database 210 for storing profile data 216, including both member profile attribute data as well as profile attribute data for various organizations. Consistent with some embodiments, when a person initially registers to become a member of the professional social network, the person will be prompted to provide some profile attribute data such as, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the professional social network the representative may be prompted to provide certain information about the organization. This information may be stored, for example, in the database 210, or another database (not shown). With some embodiments, the profile data 216 may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or a seniority level within a particular company. With some embodiments, importing or otherwise accessing data from one or more externally hosted data sources may enhance profile data 216 for both members and organizations. For instance, with companies in particular, financial data may be imported from one or more external data sources, and made part of a company's profile.

The profile data 216 may also include information regarding settings for members of the professional social network. These settings may comprise various categories, including, but not limited to, privacy and communications. Each category may have its own set of settings that a member may control.

Once registered, a member may invite other members, or be invited by other members, to connect via the professional social network. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, may be stored and maintained as social graph data within a social graph database 212.

The professional social network may provide a broad range of other applications and services that allow members the opportunity to share and receive information, often customized to the interests of the member. For example, with some embodiments, the professional social network may include a photo sharing application that allows members to upload and share photos with other members. With some embodiments, members may be able to self-organize into groups, or interest groups, organized around a subject matter or topic of interest. With some embodiments, the professional social network may host various job listings providing details of job openings with various organizations.

In some embodiments, the professional social network provides an application programming interface (API) module via which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. In particular, some third-party applications may reside and execute on one or more mobile devices (e.g., a smartphone, or tablet computing devices) having a mobile operating system.

The data in the data layer 205 may be accessed, used, and adjusted by the Large Scale Optimizing Engine 206 as will be described in more detail below in conjunction with FIGS. 3-7. Although the Large Scale Optimizing Engine 206 is referred to herein as being used in the context of a professional social network, it is contemplated that it may also be employed in the context of any website or online services, including, but not limited to, content sharing sites (e.g., photo- or video-sharing sites) and any other online services that allow users (i.e. member accounts) to have a profile and present themselves or content to other users. Additionally, although features of the present disclosure are referred to herein as being used or presented in the context of a web page, it is contemplated that any user interface view (e.g., a user interface on a mobile device or on desktop software) is within the scope of the present disclosure. In one embodiment, the data layer 205 further includes a database 214 that includes machine learning features 218 for determining probabilities of engagement or complaint by one or more member accounts.

Figure 3:
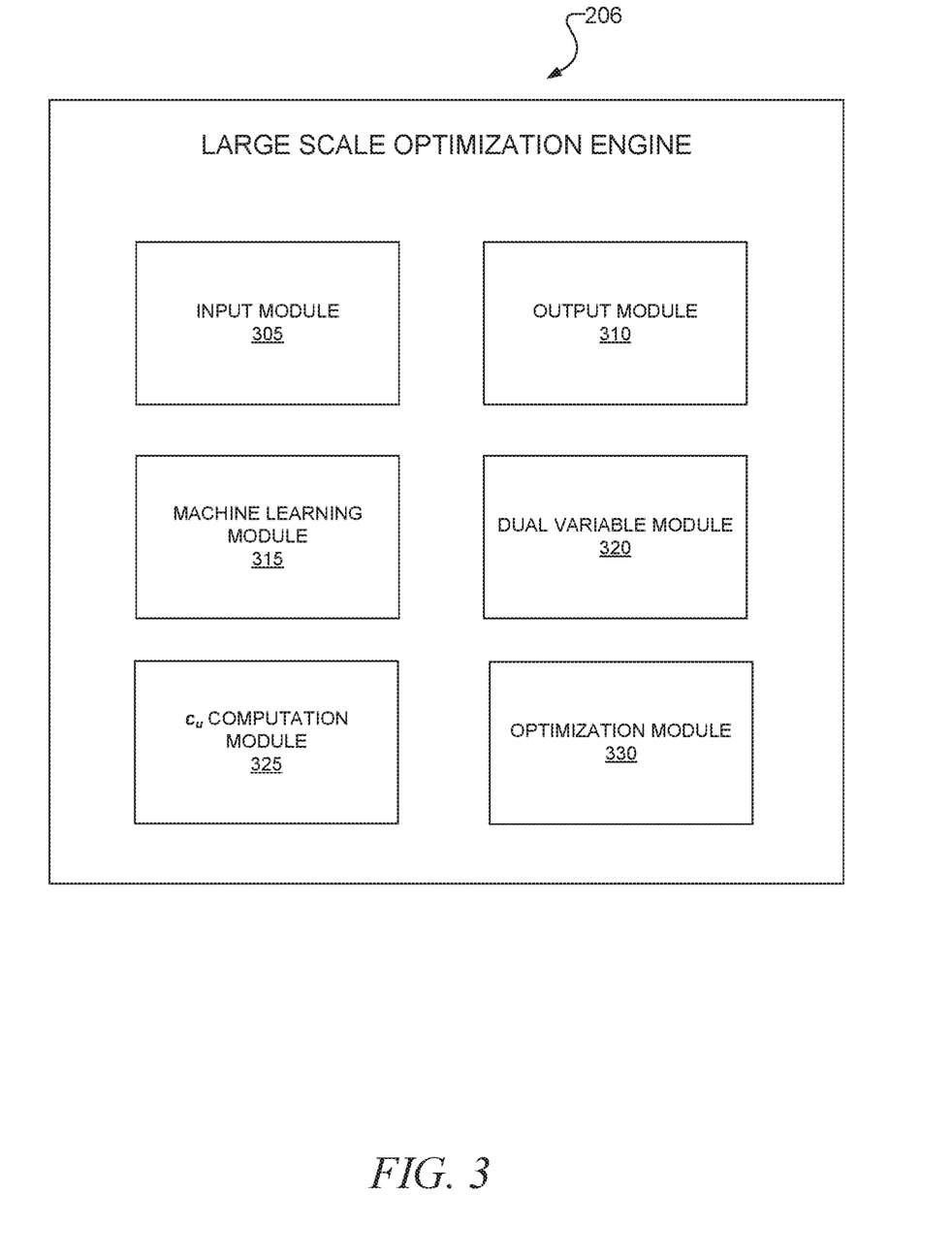
FIG. 3 is a block diagram showing example components of a Large Scale Optimizing Engine, according to some embodiments.

FIG. 3 is a block diagram showing example components of a Large Scale Optimizing Engine 206, according to some embodiments.

The input module 305 is a hardware-implemented module that controls, manages and stores information related to any inputs from one or more components of system 102 as illustrated in FIG. 1 and FIG. 2. In various embodiments, the input is a vector that includes the probability of each member account being engaged with a set of content items as well as a weighted prior display probability of each content item in a set of content items. It also includes the probability of each member account disliking or complaining about a content item in a set of content items.

The output module 310 is a hardware-implemented module that controls, manages and stores information related to which sends any outputs to one or more components of system 100 of FIG. 1 (e.g., one or more client devices 110, 112, third party server 130, etc.). In some embodiments, the output is a vector that includes display probabilities of each content item in a set of content items. An output vector is generated for each member account.

The machine learning module 315 is a hardware implemented module which manages, controls, stores, and accesses information related to executing machine learning algorithm(s) to determine relevance of a content item to a member account. This machine learning module 315 generates a required input vector. For example, the module 315 determines the probability of a member account engaging with a content item in a set of content items. It also determines the probability of a member disliking or complaining about an item in the set of items. These vectors are then used as the input to the optimization problem.

The dual variable module 320 is a hardware implemented module which manages, controls, stores, and accesses information related to determining dual variables.

The $c_u$ computation module 325 is a hardware implemented module which manages, controls, stores, and accesses information related to calculate values for a vector (s).

The optimization module 330 is a hardware implemented module which manages, controls, stores, and accesses information related to executing a multi-objective optimization algorithm.

Figure 4:
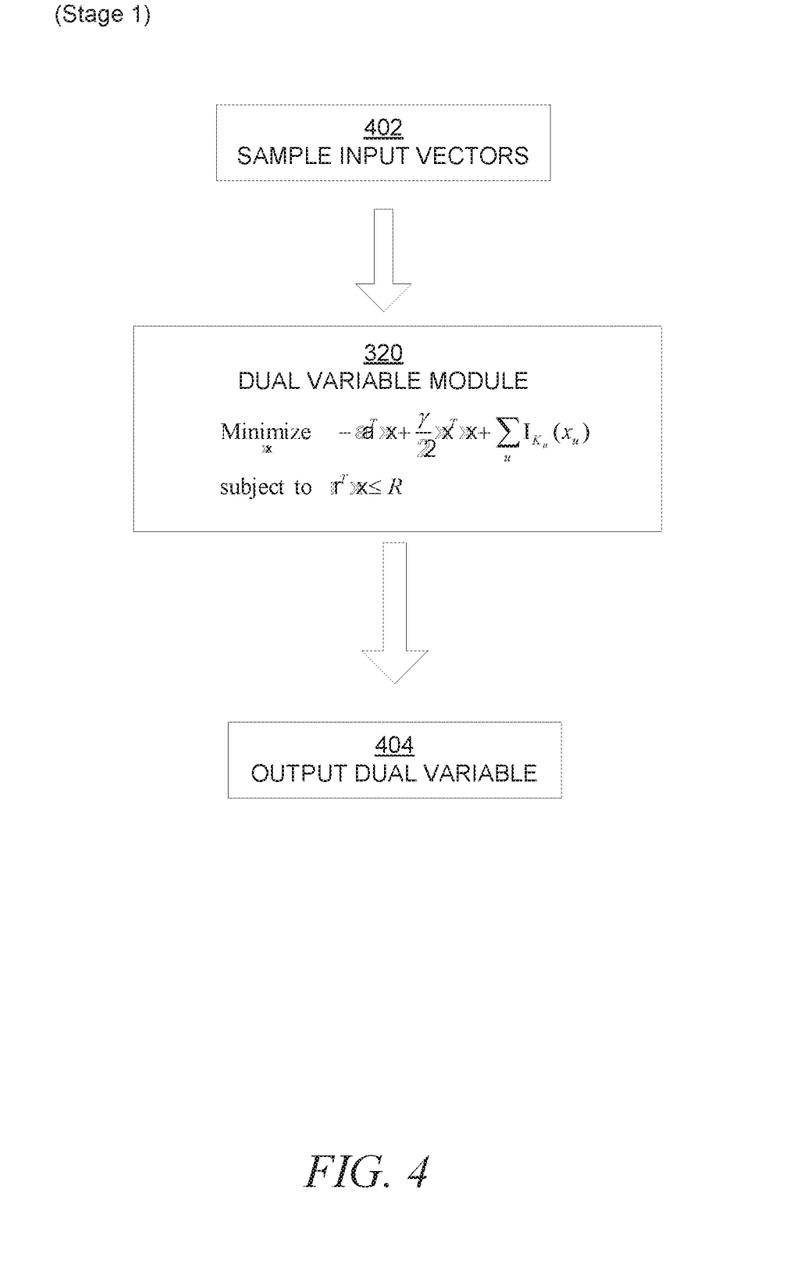
FIG. 4 is a block diagram showing a stage one data flow in a Large Scale Optimizing Engine, according to example embodiments.

FIG. 4 is a block diagram showing a stage one data flow in a Large Scale Optimizing Engine 206, according to example embodiments. The data flow may be implemented by one or more of the modules illustrated in FIG. 3, and is discussed by way of reference thereto.

According to various embodiments, the Large Scale Optimizing Engine 206 samples a subset of the member accounts to determine the sample input vectors 402. The Large Scale Optimizing Engine 206 utilizes, as input, a set of vectors 402—along with a pre-defined set of content items (1–i). Each vector is associated with a particular sampled member account. That is, a first vector is associated with a first sampled member account and a second vector is associated with a second sampled member account.

Each sampled member account's vector (e.g. vector a) includes a probability of whether that sampled respective member account will engage with a given content item in the pre-defined set of content items. Engagement with a content item can be performance of one or more types of a social network user actions (such as viewing, sharing, liking, saving, flagging, accessing, tagging) on a given item and/or performance of one or more types of a user action in response to display of the given item. For example, a vector for the first member account has a first probability of selection by the first member account of a first content item, a second probability of selection by the first member account of a second content item and so on up to an i-th probability of selection by the first member account of an i-th content item. Types of content items can be email, articles, images, messages, notifications, recommendations or advertisements.

It is understood that the probability of selection (i.e. probability of engagement) of a particular content item by a respective member account can be computed according to a machine learning algorithm that takes into account one or more learned member account features and one or more learned content item features. As such, probability of content item selection can be inferred based on training data of past member account activity to calculate an estimation as to how likely the respective member account may or may not select the particular content item.

Each sampled member account has a corresponding additional vector (e.g. vector r), which includes probabilities, for each content item i, that display of content item i to that member account (u) will trigger social network complaint behaviour from that member account. T represents a transpose operator. The Vector x denotes the serving plan, which includes a probability of showing each content item i, to member u. $K_u$ denotes the user level constraints for user u. γ is the parameter which controls the relative importance of the engagement maximization and the deviation of x from the prior serving plan. R denotes the maximum acceptable number of complaints. Output of Stage 1 is an output dual variable 404, which represents the optimal dual variable corresponding to the global constraint obtained by solving the corresponding dual problem of the primal optimization problem posed in 320.

Figure 5:
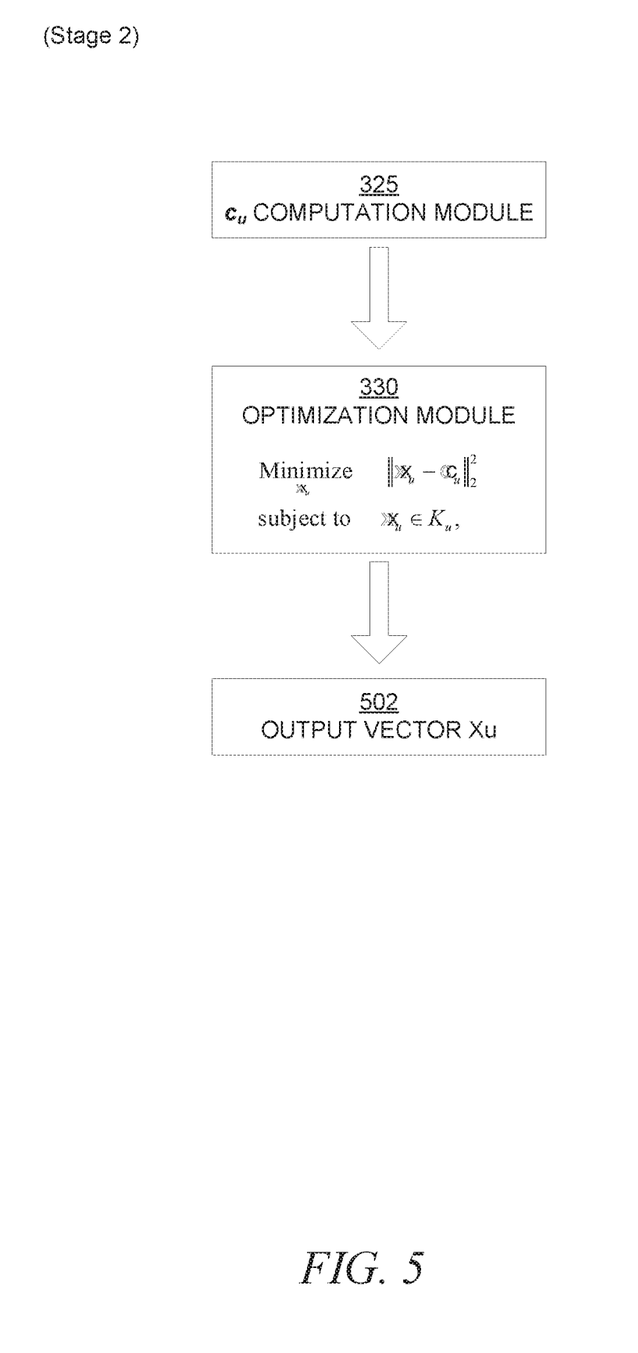
FIG. 5 is a block diagram showing a stage two data flow in a Large Scale Optimizing Engine, according to example embodiments.

FIG. 5 is a block diagram showing a stage two data flow in a Large Scale Optimizing Engine 206, according to example embodiments. The data flow may be implemented by one or more of the modules illustrated in FIG. 3, and is discussed by way of reference thereto.

The $c_u$ computation module 325 of the Large Scale Optimizing Engine 206 executes one or more encoded instructions to perform a calculation(s) to determine $c_u = (a - \mu r)_u / \gamma$. The vector $c_u$ represents an optimal serving plan for member account u prior to enforcing the user level constrains for member account u. As discussed, each member account has corresponding a and r vectors. Vector a includes, for each content item i, a value $a_{ui}$—where $a_{ui} = p_{ui} + yq_{ui}$. Each value of $q_{ui}$ in vector q represents the prior probability of displaying content item i to member account u. Each value of $p_{ui}$ in vector p represents probability of member account u engaging with content item i, provided content item i is shown to member account u. The scalar μ is the output dual variable 404 which corresponds to the global constraint of the primal optimization problem 320.

The optimization module 330 executes one or more encoded instructions to perform a multi-objective optimization solution according to competing constraints. In the multi-objective optimization solution, x is a vector 502 that includes a value $x_{u,i}$ for each content item i that represents a probability of display of that content item to the member account u. We denote the part of the vector x corresponding to each member account u by the vector $x_u$. For each member account u, the Large Scale Optimizing Engine 206 accesses the corresponding vector x and selects the content item that has the highest display probability value. For example, for member account u, if $x_{u3}$ has the highest display probability value from amongst $x_{u1}, x_{u2}, \ldots x_{uN}$, then the Large Scale Optimizing Engine 206 selects the third content item for display to member account u.

In various embodiments, Stage 2 can be executed in either the offline mode or the online mode. For Stage 2 in the offline mode, the Large Scale Optimizing Engine 206 performs batch processing over a set of users and executes the following Algorithm A with inputs $p_u$ (obtained offline) and μ (from Stage 1, the dual variable corresponding to 320) to get $x_u$ for the users in the batch. For Stage 2 in the online mode corresponding to online applications, when a member account u logs into a session on the social network service, the vector $p_u$ is evaluated for member account u. Vector $p_u$ is then input into Algorithm A along with the dual variable μ to obtain $x_u$ for the member account u.

| Algorithm A |  |
|---|---|
| 1: | Input : Optimal dual solution μ and an incoming user u |
| 2: | Output : Primal serving plan $\{x_{um}\}$ |
| 3: | Compute $c_u = (a - \mu r)_u / \gamma$ |
| 4: | Solve → $\underset{x_u}{\text{Minimize}} \ \|x_u - c_u\|_2^2$ subject to $x_u \in K_u$, to get $x_u$. |
| 5: | return $x_u$ |

Figure 6:
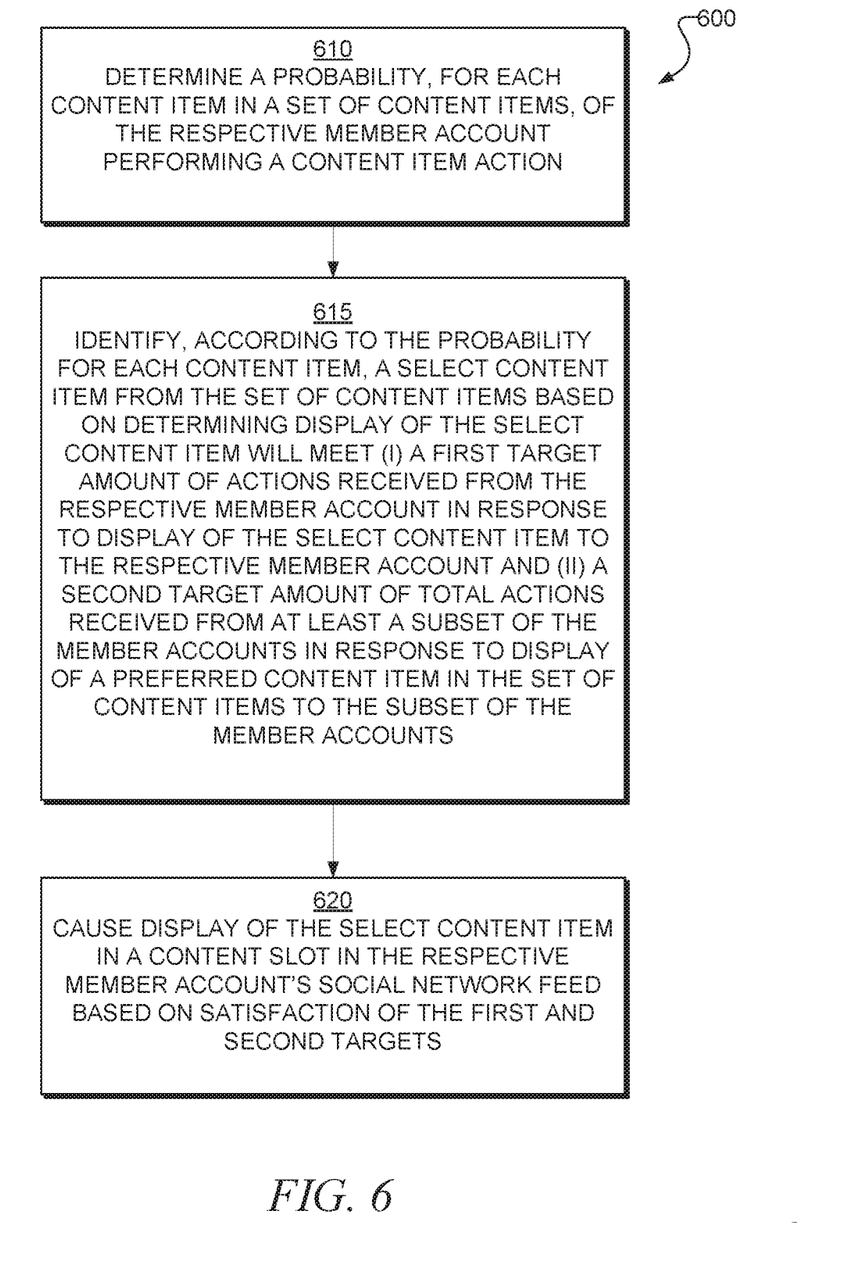
FIG. 6 is a flowchart illustrating an example method, according to various embodiments.

FIG. 6 is a flowchart 600 illustrating an example method, according to various embodiments.

At operation 610, the Large Scale Optimizing Engine 206 determines a probability, for each content item in a set of content items, of the respective member account performing a content item action. In one embodiment, the Large Scale Optimizing Engine 206 assembles an engagement input vector for the respective member account. The engagement input vector (e.g. vector a) includes a content item action probability for each content item in the set of content items. The Large Scale Optimizing Engine 206 assembles a complaint input vector for the respective member account. The complaint input vector (e.g. vector r) includes a content item complaint probability for each content item in the set of content items. Based on a sample group of the plurality of member accounts, the Large Scale Optimizing Engine 206 assembles an importance input vector, the importance input vector (e.g. vector μ) includes an importance weight for each content item in the set of content items.

At operation 615, the Large Scale Optimizing Engine 206 identifies, according to the probability for each content item, a select content item from the set of content items based on determining display of the select content item will meet (i) a first target amount of actions received from the respective member account in response to display of the select content item to the respective member account and (ii) a second target amount of total actions received from at least a subset of the member accounts in response to display of a preferred content item in the set of content items to the subset of the member accounts.

The Large Scale Optimizing Engine 206 causes display of the preferred content item in a content slot of a respective social network feed of each member account in the subset of member accounts based on satisfaction of the first and second targets. In one embodiment, the Large Scale Optimizing Engine 206 executes the multi-objective optimization algorithm simultaneously for each member account.

At operation 620, the Large Scale Optimizing Engine 206 causes display of the select content item in a content slot in the respective member account's social network feed based on satisfaction of the first and second targets.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and Server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
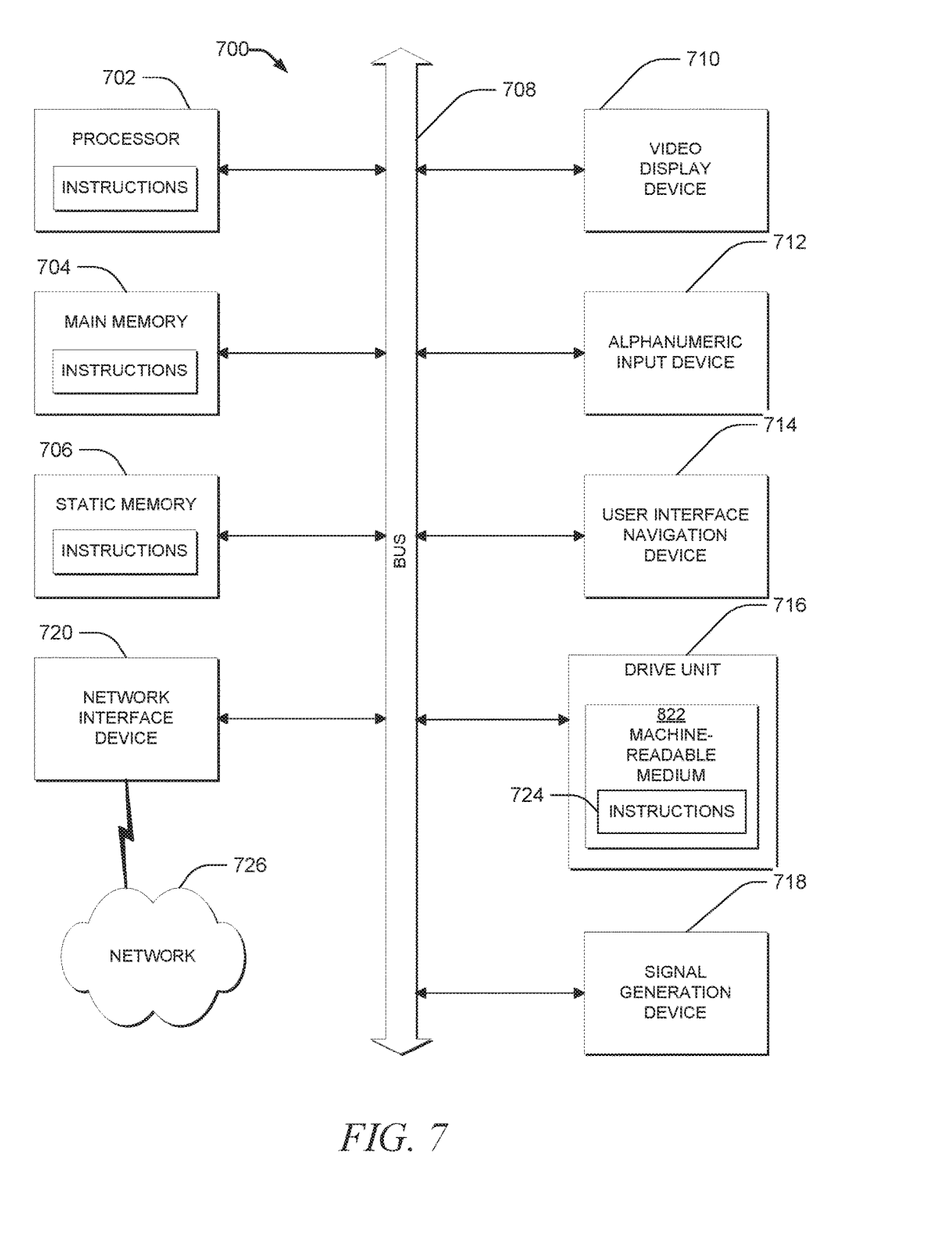
FIG. 7 is a block diagram of an example computer system on which operations, actions and methodologies described herein may be executed, in accordance with an example embodiment.

FIG. 7 is a block diagram of an example computer system 700 on which operations, actions and methodologies described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes a processor 702 (e.g., a central processing unit (CPU), a graphics processing unit (GPU) or both), a main memory 704, and a static memory 706, which communicate with each other via a bus 708. Computer system 700 may further include a video display device 710 (e.g., a liquid crystal display (LCD) or a cathode ray tube (CRT)). Computer system 700 also includes an alphanumeric input device 712 (e.g., a keyboard), a user interface (UI) navigation device 714 (e.g., a mouse or touch sensitive display), a disk drive unit 716, a signal generation device 718 (e.g., a speaker) and a network interface device 720.

Disk drive unit 716 includes a machine-readable medium 722 on which is stored one or more sets of instructions and data structures (e.g., software) 724 embodying or utilized by any one or more of the methodologies or functions described herein. Instructions 724 may also reside, completely or at least partially, within main memory 704, within static memory 706, and/or within processor 702 during execution thereof by computer system 700, main memory 704 and processor 702 also constituting machine-readable media.

While machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 724 may further be transmitted or received over a communications network 726 using a transmission medium. Instructions 724 may be transmitted using network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer system, comprising:
a processor;
a memory device holding an instruction set executable on the processor to cause the computer system to perform operations comprising:
for each respective member account in a plurality of member accounts of a social network service:
determining a probability, for each content item in a set of content items, of the respective member account performing a content item action on the content item, wherein each content item is an object displayable in a feed area of a graphical user interface, and wherein each content item action is a graphical user interface interaction, by a member associated with the respective member account, with the content item when the content item is displayed in the feed area of the graphical user interface;
identifying, according to the probability for each content item, a select content item from the set of content items based on determining display of the select content item will meet (i) a first target amount of actions received from the respective member account in response to display of the select content item to the respective member account and (ii) a second target amount of total actions received from at least a subset of the member accounts in response to display of a preferred content item in the set of content items to the subset of the member accounts; and
  causing display of the select content item in a content slot in the respective member account's social network feed based on satisfaction of the first and second targets.

2. The computer system as in claim 1, further comprises:
causing display of the preferred content item in a content slot of a respective social network feed of each member account in the subset of member accounts based on satisfaction of the first and second targets.

3. The computer system as in claim 1, wherein identifying the select content item comprises:
  executing a multi-objective optimization algorithm to identify the select content item.

4. The computer system as in claim 3, wherein executing of a multi-objective optimization algorithm to identify the select content item comprises:
  executing the multi-objective optimization algorithm simultaneously for each member account.

5. The computer system as in claim 3, wherein determining a probability, for each content item is a set of content items, of the respective member account performing a content item action comprises:
  assembling an engagement input vector for the respective member account, the engagement vector including a content item action probability for each content item in the set of content items.

6. The computer system as in claim 5, further comprising:
  assembling a complaint input vector for the respective member account, the complaint input vector including a content item complaint probability for each content item in the set of content items.

7. The computer system as in claim 6, further comprising:
  based on a sample group of the plurality of member accounts, assembling an importance input vector, the importance input vector including an importance weight for each content item in the set of content items.

8. The computer system as in claim 7, wherein executing the multi-objective optimization algorithm for each member account comprises:
  executing the multi-objective optimization algorithm based on input comprising the engagement input vector, the complaint input vector and the importance input vector.

9. A computer-implemented method comprising:
  determining a probability, for each content item in a set of content items, of the respective member account performing a content item action on the content item, wherein each content item is an object displayable in a feed area of a graphical user interface, and wherein each content item action is a graphical user interface interaction, by a member associated with the respective member account, with the content item when the content item is displayed in the feed area of the graphical user interface;
  identifying, according to the probability for each content item, a select content item from the set of content items based on determining display of the select content item will meet (i) a first target amount of actions received from the respective member account in response to display of the select content item to the respective member account and (ii) a second target amount of total actions received from at least a subset of the member accounts in response to display of a preferred content item in the set of content items to the subset of the member accounts; and
  causing display of the select content item in a content slot in the respective member account's social network feed based on satisfaction of the first and second targets.

10. The computer-implemented method as in claim 9; further comprises:
causing display of the preferred content item in a content slot of a respective social network feed of each member account in the subset of member accounts based on satisfaction of the first and second targets.

11. The computer-implemented method as in claim 9, wherein identifying the select content item comprises:
  executing a multi-objective optimization algorithm to identify the select content item.

12. The computer-implemented method as in claim 11, wherein executing of a multi-objective optimization algorithm to identify the select content item comprises:
  executing the multi-objective optimization algorithm simultaneously for each member account.

13. The computer-implemented method as in claim 11, wherein determining a probability, for each content item is a set of content items, of the respective member account performing a content item action comprises:
  assembling an engagement input vector for the respective member account, the engagement vector including a content item action probability for each content item in the set of content items.

14. The computer-implemented method as in claim 13, further comprising:
  assembling a complaint input vector for the respective member account, the complaint input vector including a content item complaint probability for each content item in the set of content items.

15. The computer-implemented method as in claim 14, further comprising:
  based on a sample group of the plurality of member accounts, assembling an importance input vector, the importance input vector including an importance weight for each content item in the set of content items.

16. The computer-implemented method as in claim 15, wherein executing the multi-objective optimization algorithm for each member account comprises:
  executing the multi-objective optimization algorithm based on input comprising the engagement input vector, the complaint input vector and the importance input vector.

17. A non-transitory computer-readable medium storing executable instructions thereon, which, when executed by a processor, cause the processor to perform operations including:
  determining a probability, for each content item in a set of content items, of the respective member account performing a content item action on the content item, wherein each content item is an object displayable in a feed area of a graphical user interface, and wherein each content item action is a graphical user interface interaction, by a member associated with the respective member account, with the content item when the content item is displayed in the feed area of the graphical user interface;
  identifying, according to the probability for each content item, a select content item from the set of content items based on determining display of the select content item will meet (i) a first target amount of actions received from the respective member account in response to display of the select content item to the respective member account and (ii) a second target amount of total actions received from at least a subset of the member accounts in response to display of a preferred content item in the set of content items to the subset of the member accounts; and causing display of the select content item in a content slot in the respective member account's social network feed based on satisfaction of the first and second targets.

18. The non-transitory computer-readable medium as in claim 17, wherein the operations further comprise:

causing display of the preferred content item in a content slot of a respective social network feed of each member account in the subset of member accounts based on satisfaction of the first and second targets.

19. The non-transitory computer-readable medium as in claim 17, wherein identifying the select content item comprises:

executing a multi-objective optimization algorithm simultaneously for each member account.

20. The non-transitory computer-readable medium as in claim 19, wherein determining a probability, for each content item is a set of content items, of the respective member account performing a content item action comprises:

assembling an engagement input vector for the respective member account, the engagement vector including a content item action probability for each content item in the set of content items;

assembling a complaint input vector for the respective member account, the complaint input vector including a content item complaint probability for each content item in the set of content items;

based on a sample group of the plurality of member accounts, assembling an importance input vector, the importance input vector including an importance weight for each content item in the set of content items; and executing the multi-objective optimization algorithm based on input comprising the engagement input vector, the complaint input vector and the importance input vector.

* * * * *